US011124327B2

(12) United States Patent
Wittmann et al.

(10) Patent No.: US 11,124,327 B2
(45) Date of Patent: Sep. 21, 2021

(54) TRANSPORT SECTION OF A PACKAGING LINE AS WELL AS METHOD FOR MODIFYING A PACKAGING LINE PROVIDED FOR ARTICLES OR ARTICLE SETS

(71) Applicant: KRONES Aktiengesellschaft, Neutraubling (DE)

(72) Inventors: Stephan Wittmann, Neubeuern (DE); Herbert Spindler, Niedermoosen (DE); Olaf Treter, Rohrdorf (DE); Juergen Werner, Bruckmühl (DE)

(73) Assignee: KRONES Aktiengesellschaft, Neutraubling (DE)

( * ) Notice: Subject to any disclaimer, the term of this patent is extended or adjusted under 35 U.S.C. 154(b) by 256 days.

(21) Appl. No.: 15/911,643

(22) Filed: Mar. 5, 2018

(65) Prior Publication Data
US 2018/0251251 A1 Sep. 6, 2018

(30) Foreign Application Priority Data
Mar. 6, 2017 (DE) .......................... 102017203581.1

(51) Int. Cl.
*B65B 65/00* (2006.01)
*B65B 35/24* (2006.01)
(Continued)

(52) U.S. Cl.
CPC .......... *B65B 65/003* (2013.01); *B65B 21/245* (2013.01); *B65B 35/24* (2013.01);
(Continued)

(58) Field of Classification Search
CPC ....... B65B 59/00; B65B 59/04; B65B 65/003; B65B 43/10; B65B 35/24; B65B 35/44;
(Continued)

(56) References Cited

U.S. PATENT DOCUMENTS 5,655,356 A * 8/1997 Ginestra ................. B65B 11/48
53/504
6,266,948 B1 * 7/2001 Serra ..................... B65B 59/003
53/566
(Continued)

FOREIGN PATENT DOCUMENTS

CN 105984601 A 10/2016
DE 4330796 3/1995
(Continued)

OTHER PUBLICATIONS

German Patent Application DE 10 2017 203 581.1 Filed Mar. 6, 2017; German Search Report dated Aug. 16, 2017.
(Continued)

*Primary Examiner* — Valentin Neacsu
*Assistant Examiner* — Jacob A Smith
(74) *Attorney, Agent, or Firm* — Simmons Perrine Moyer Bergman PLC

(57) ABSTRACT

Disclosed is a system (1) for forming a transport section for a packaging line and for coordinating the transport section to individual articles or article sets with different packaging types. The system (1) comprises at least one module (3), which at least one module (3) has at least two individual module units (5, 7), which at least two individual module units (5, 7) cooperate in a first operating mode (B1) of the system (1) for the transport of individual articles or article sets provided for a first packaging type. It is furthermore provided that the at least two individual module units (5, 7) are each designed to be movable, and that the system (1) is transferable by way of a movement of the at least two individual module units (5, 7) into a second operating mode (B2), which is aligned to a transport of individual articles or article sets provided for a second packaging type that differs from the first packaging type.

22 Claims, 5 Drawing Sheets

(51) Int. Cl.
    *B65B 43/10* (2006.01)
    *B65B 43/12* (2006.01)
    *B65B 59/02* (2006.01)
    *B65G 47/52* (2006.01)
    *B65G 21/12* (2006.01)
    *B65G 21/10* (2006.01)
    *B65B 35/44* (2006.01)
    *B65B 59/00* (2006.01)
    *B65B 21/24* (2006.01)
    *B65B 59/04* (2006.01)
    *B65B 61/20* (2006.01)
    *B65B 53/02* (2006.01)

(52) U.S. Cl.
    CPC .............. *B65B 35/44* (2013.01); *B65B 43/10* (2013.01); *B65B 43/126* (2013.01); *B65B 59/001* (2019.05); *B65B 59/003* (2019.05); *B65B 59/005* (2013.01); *B65B 59/04* (2013.01); *B65B 61/20* (2013.01); *B65G 21/10* (2013.01); *B65G 21/12* (2013.01); *B65G 47/52* (2013.01); *B65B 53/02* (2013.01)

(58) Field of Classification Search
    CPC ... B65B 21/243; B65B 59/001; B65B 59/003; B65B 59/005; B65B 59/02; B65B 61/20
    USPC ........................ 53/201, 558, 564, 443, 531
    See application file for complete search history.

(56) References Cited

U.S. PATENT DOCUMENTS

| | | | | |
|---|---|---|---|---|
| 6,357,212 | B1* | 3/2002 | Salm | ............... B65B 51/023 53/558 |
| 6,595,250 | B1* | 7/2003 | Paulus | ............... B65B 65/003 141/231 |
| 8,966,864 | B2 | 3/2015 | Rabec | |
| 9,016,035 | B2* | 4/2015 | Buta | ............... B65B 23/20 53/474 |
| 9,394,113 | B2* | 7/2016 | Werner | ............... E04B 1/10 |
| 9,637,314 | B2 | 5/2017 | Werner et al. | |
| 10,246,206 | B2 | 4/2019 | Cox et al. | |
| 2005/0050858 | A1* | 3/2005 | Cremers | ............... B65B 35/44 53/445 |
| 2009/0290961 | A1* | 11/2009 | Langston | ............... B65B 5/04 414/222.01 |
| 2011/0056174 | A1* | 3/2011 | Perl | ............... B65B 13/02 53/414 |
| 2012/0023866 | A1* | 2/2012 | Rabec | ............... B65B 59/003 53/235 |
| 2013/0111855 | A1* | 5/2013 | Hendricks | ............... B65B 11/004 53/473 |
| 2013/0220774 | A1* | 8/2013 | Werner | ............... E04C 2/12 198/583 |
| 2013/0247521 | A1* | 9/2013 | May | ............... B65B 57/00 53/473 |
| 2014/0024515 | A1* | 1/2014 | Wimmer | ............... B31B 50/26 493/441 |
| 2014/0102044 | A1* | 4/2014 | Berglin | ............... B65B 43/10 53/452 |
| 2015/0329231 | A1* | 11/2015 | Moncrief | ............... B65B 7/18 53/443 |
| 2015/0344235 | A1* | 12/2015 | Barone | ............... B65B 35/56 414/758 |
| 2015/0367974 | A1* | 12/2015 | Sytema | ............... B65B 57/12 53/461 |
| 2016/0176561 | A1* | 6/2016 | Findlay | ............... B25J 15/0014 53/438 |
| 2017/0210500 | A1 | 7/2017 | Sytema et al. | |

FOREIGN PATENT DOCUMENTS

| | | | |
|---|---|---|---|
| DE | 202004019409 | 5/2005 | |
| DE | 102015107630 A1 | 11/2016 | |
| DE | 102015211955 A1 | 12/2016 | |
| EP | 2336037 A1 | 6/2011 | |
| WO | WO-2012062549 A1 * | 5/2012 | ............. B65G 21/12 |

OTHER PUBLICATIONS

Chinese First Office Action dated Dec. 2, 2019.
German Patent Application DE 10 2017 203 581.1 filed Mar. 6, 2017—Extended European Search Report dated Nov. 26, 2018.

\* cited by examiner

TRANSPORT SECTION OF A PACKAGING LINE AS WELL AS METHOD FOR MODIFYING A PACKAGING LINE PROVIDED FOR ARTICLES OR ARTICLE SETS

CLAIM OF PRIORITY

The present application claims priority to German Application DE 10 2017 203 581.1, filed on Mar. 6, 2017, which is incorporated by reference.

FIELD OF THE INVENTION

The present invention relates to a system for forming a transport section for a packaging line with at least two different exchangeable modules. The invention moreover relates to a method for modifying or converting a packaging line provided for articles or article sets.

BACKGROUND OF THE INVENTION

There is a wide variety of packaging alternatives for processing, assembling, grouping, and packaging articles, such as beverage containers. PET containers are currently the most commonly used type of containers, for instance for beverages, but they are relatively thin-walled and, even when filled, not completely dimensionally stable. For this reason and for the purpose of improved logistic handling, a wide variety of different packages are used for processing and/or packaging grouped individual containers. It is possible to place the containers in a grouped arrangement onto a box blank, for instance, the edges of which are folded upward. It is also possible to use cardboard blanks corresponding in size at least to the base size of an arranged package, with the individual containers or beverage containers that are part of a particular package or bundle standing on these blanks.

In order to obtain a stable bundle assembly that can be easily transported and stacked, such bundle arrangements can optionally be subsequently wrapped in thermoplastic film, which is then applied by a heat shrinking process onto the beverage containers that are part of a particular bundle. A further packaging variant is referred to as "shrink-only packaging", because the assembled containers are wrapped in thermoplastic film and the thermoplastic film is subsequently shrunk onto the particular assembled containers without using any packaging material or any blanks apart from the thermoplastic film.

In such a package variant, the dimensional stability of the package is ensured solely by the shrinking foil. Currently known packaging machines and their conveying devices are normally specifically optimized to a certain type, size, and/or shape of conveyed goods. Different types of bundles or different packaging alternatives moreover require the use of different, specific conveying devices. In some circumstances, such as changes of products, it is therefore possible that the use of certain conveying devices cannot be continued if these devices are neither suited to transporting the specific, currently required type of individual articles or containers, nor to handling their specifically required packaging material. Disturbances in the article transporting process can also occur if the packaging machines are specifically adjusted to transport a different product variant. Conveying problems such as these may particularly arise when there are changes from packed goods, such as bundle units, to loose goods, such as individual beverage containers or the like. Articles that are to be conveyed in a standing position, such as the beverage containers, are prone to tipping over and/or falling down when using conveying devices that are adapted for transporting bundle units, especially if the transport modules are not equipped with conveyor support surfaces that are sufficiently flat and level to safely transport objects with a very small base size. For this reason, transport units are exchanged for being used in practice.

Apparatuses are already known from prior art that serve to prevent such problems by comprising a plurality of modules that can be exchangeably or selectively inserted into a specific section of a transport path. Such an apparatus is disclosed in WO 2012/062549 A1, for example. The apparatus described in the document relates to a machine for processing and/or packaging objects, the machine having a substantially horizontal transport path for conveying articles, bundles and/or packaging units. The machine comprises a first horizontal conveying device with at least one transport means for a first operating mode, which horizontal conveying device can be replaced by a further horizontal conveying device with at least one second transport means that is different from the first transport means so as to establish at least one further operating mode.

Practice has shown that such a process of exchanging horizontal conveying devices to convert or adapt the machine to different operating modes requires a certain amount of time that should be kept as short as possible in order to be able to quickly convert such a machine to different operating modes. Exchanging or replacing horizontal conveying devices for different operating modes is furthermore cumbersome, and it is therefore desirable to provide apparatuses and methods that simplify such conversions.

SUMMARY OF THE INVENTION

One object of the invention can therefore be seen in providing a generic apparatus or a corresponding method, as the case may be, where the apparatus can be converted or adapted to different operating modes in a time-optimized manner. In addition, the apparatus should have a simple structure, and the method should be easy to carry out.

The above objects are fulfilled by an apparatus and a method comprising the features in the independent claims. Further advantageous embodiments of the invention are described in the subclaims.

The invention relates to a system for forming a transport section for a packaging line and for converting the transport section to individual articles or article sets with different packaging types. The individual articles can take the form of individual beverage containers and, in particular, of individual PET bottles. The article sets can be formed by sets of a plurality of beverage containers provided for a specific bundle and, in particular, by sets of a plurality of PET bottles intended for a specific bundle.

The system comprises at least one module, which at least one module has at least two individual module units. In a first operating mode of the system, the at least two individual module units cooperate for the transport of individual articles or article sets provided for a first packaging type. It is possible that, in the first operating mode, the at least two individual module units cooperate for the transport of individual articles or article sets provided for a first packaging type without having a mechanical coupling. Accordingly, the at least two individual module units can in each instance be mechanically completely separate from each other in the first operating mode and also in a second operating mode described below. Embodiments have therefore proved successful where the at least two module units are movable relative to each other without having to undo any mechanical connections. It is accordingly possible that the at least two individual module units can each operate independently of each other. It is in particular possible that each of the at least two individual module units has at least one own actuator or at least one own motor associated with it, as the case may be, by which the particular module unit can be operated or driven, as the case may be, in the first operating mode for the transport of individual articles or article sets provided for a first packaging type. The at least one own actuator or the at least one own motor, as the case may be, of at least one first of the at least two module units as well as the at least one own actuator or the at least one own motor, as the case may be, of at least one second of the at least two module units can be in contact with a common control unit and/or regulating unit, which in the first operating mode controls, in a manner coordinated to each other, the at least one own actuator of the at least one first module unit and the at least one own actuator of the at least one second module unit for the transport of individual articles or article sets provided for a first packaging type.

It is moreover provided that the at least two individual module units are each designed to be movable, and that the system is convertible or transferable by way of a movement of the at least two individual module units into a second operating mode, which is aligned to a transport of individual articles or article sets provided for a second packaging type.

In practice, embodiments have proved successful where the at least two individual module units are downwardly movable for the second operating mode, and where the system comprises a transfer plate that can be placed onto the at least two downwardly moved individual module units for the second operating mode.

In this context, it is possible that the system comprises at least one vertical linear guiding device to which the two individual module units are mechanically coupled for their downward movement. In this instance, each of the at least two individual module units can be coupled to an own vertical linear guiding device.

In particular, the at least one module can be aligned to a transport of individual articles or article sets provided for a first packaging type, the first packaging type being formed by planar blanks of packaging material with lateral, front, and/or back flaps to be erected. Such like planar blanks of packaging material with lateral, front, and/or back flaps to be erected are referred to as "trays" in practice and in the following description.

Furthermore, the system can comprise at least one further module (also referred to as a second module), the at least one further module being aligned to a transport of individual articles or article sets provided for the second packaging type. The at least two individual module units of the at least one first module can be movable relative to each other. The at least one further module can moreover be inserted for the second operating mode into an operating position cleared by the movement of the at least two individual module units relative to each other. In particular, the at least one further module can be aligned to a transport for individual articles or article sets provided for a second packaging type, the second packaging type being formed by planar blanks of packaging material without any lateral, front, and/or back flaps to be erected. The second packaging type can thus be formed by planar blanks of packaging material that provide an even or an essentially even support surface for particular individual articles or particular article sets. Suchlike planar blanks of packaging material are referred to as "pads" in practice and in the following description.

The system can form a specific operating position, into which specific operating position the at least one module or the at least one further module can be optionally inserted. The specific operating position can be associated with a transport section of a packaging line or the specific operating position can form a transport section of a packaging line, as the case may be. It is thus possible that the at least one module and the at least one further module are alternately convertible or transferable into the specific operating position or are alternately inserted into the specific operating position, as the case may be. The particular at least one module that is inserted in the specific operating position or the at least one further module, as the case may be, can form part of a packaging line for the individual articles or article sets.

Furthermore, it is possible that the at least one module is made from at least two module units that cooperate in the specific operating position, with the at least two module units that cooperate in the specific operating position being movable relative to each other and thereby clearing the specific operating position. In this context it is conceivable that at least two module units of the at least one module cooperate in the specific operating position in such a manner that the at least two module units in the specific operating position are in operative connection with each other for the transport of individual articles or article sets.

At least one first module unit and the at least one second module unit of the at least two individual module units can furthermore each form a plurality of preferably circulatingly moved folding fingers or circulatingly guided folding fingers, as the case may be, with the plurality or the particular multitude, as the case may be, of preferably circulatingly moved folding fingers or circulatingly guided folding fingers, as the case may be, being formed for erecting flaps of individual blanks of packaging material.

In particular, the at least one first module unit can have a first multitude of circulatingly moved folding fingers that are prepared for erecting flaps preceding in transport direction or front flaps, as the case may be, of individual blanks of packaging material. Moreover, the at least one second module unit can have a second multitude of circulatingly moved folding fingers, with the second multitude of circulatingly moved folding fingers being prepared for erecting back flaps of individual blanks of packaging material. The first multitude of folding fingers can be moved or guided, as the case may be, in a circulating manner by way of a first chain formed as part of the first module unit. The second multitude of folding fingers can be moved or guided, as the case may be, in a circulating manner by way of a second chain that is likewise formed as part of the at least one first module unit. The first chain and the second chain can run parallel to each other. In addition, the first chain and the second chain, as well as the first and the second multitude of folding fingers in contact with the first and the second chain, together with the at least one first module unit, can, where applicable, be removed from the specific operating position, or can, where applicable, be moved relative to the at least one second module unit, as the case may be, thereby clearing the previously already mentioned specific operating position, or for the purpose of converting or transferring the system into the second operating mode, as the case may be.

In addition, the at least one second module unit can have a first multitude of circulatingly moved folding fingers that are prepared for erecting flaps preceding in transport direction or front flaps, as the case may be, of individual blanks of packaging material. Moreover, the at least one second module unit can have a second multitude of circulatingly moved folding fingers, with the second multitude of circulatingly moved folding fingers being prepared for erecting back flaps of individual blanks of packaging material. The second multitude of folding fingers can be moved or guided, as the case may be, in a circulating manner by way of a second chain that is likewise formed as part of the at least one second module unit. The first chain and the second chain can run parallel to each other. In addition, the first chain and the second chain, as well as the first and the second multitude of folding fingers of the at least one second module unit that are in contact with the first and the second chain, together with the at least one first module unit, can, where applicable, be removed from the specific operating position, or can be moved relative to the at least one first module unit, as the case may be, thereby clearing the previously already mentioned specific operating position, or for the purpose of converting or transferring the system into the second operating mode, as the case may be.

Embodiments have proved successful where the at least one first module unit and the at least one second module unit are movable relative to each other in each instance in horizontal direction, thereby clearing the specific operating position or the transport section, as the case may be, and where they are in this context transferred into a particular waiting position formed by the system, such that the specific operating position is disposed between the at least one first module unit and the at least one second module unit or such that the at least one first module unit and the at least one second module unit of the specific operating position are adjacent on oppositely located sides, as the case may be. It is hereby possible that at least one further module, which is described below, can be inserted between the at least one first module unit and the at least one second module unit into the specific operating position. It is also possible that the at least one first module unit and the at least one second module unit are movable relative to each other in each instance in vertical direction, thereby clearing the specific operating position, and that they are in this context transferred into a particular waiting position formed by the system. In embodiments such as these, it is conceivable that the at least one further module passes on into the specific operating position by a horizontal movement or is converted or transferred and/or brought into the specific operating position by a horizontal movement.

It is furthermore conceivable for the system to comprise at least one linear guiding device which the at least one first module unit and the at least one second module unit are in mechanical contact with for a relative movement in each instance in horizontal direction. The system can furthermore comprise at least one actuator, by way of which at least one actuator the at least one first module unit is movable relative to the at least one second module unit in horizontal direction along the at least one linear guiding device. The at least one actuator can be operated by way of a control unit and/or regulating unit for the relative movement of the at least one first module unit in relation to the at least one second module unit in horizontal direction.

Moreover, embodiments have proved successful where the at least one first module unit and the at least one second module unit are each movable in perpendicular direction. As mentioned, it is in particular possible in this context that the at least one first module unit and the at least one second module unit are in each instance lifted up in vertical direction or lowered down in vertical direction, whereupon a transfer plate is placed or laid, as the case may be, onto the at least one first module unit and the at least one second module unit, and the individual articles or article sets are moved hereon in a sliding manner or are moved in surface contact, as the case may be, along the transfer plate that has been placed or laid, as the case may be, on the at least one first module unit and the at least one second module unit. If flaps of blanks of packaging material are to be erected at a later point in time by the particular multitude of folding fingers of the at least one first module unit and of the at least one second module unit, it can be provided that the transfer plate is removed from the at least one first module unit and from the at least one second module unit, that the at least one first module unit as well as the at least one second module unit are in each instance lifted up in vertical direction or lowered down in vertical direction, and that temporally thereafter flaps of particular blanks of packaging material are erected by way of the particular multitude of folding fingers of the at least one first module unit and of the at least one second module unit. It is moreover conceivable that, prior to the flaps of the particular blanks of packaging material being erected and after the transfer plate being removed, the at least one first module unit and the at least one second module unit each carry out a horizontal movement in which the at least one first module unit and the at least one second module unit draw closer to each other.

It is also possible that the at least one first module unit and the at least one second module unit each comprise at least one own drive, where the at least one own drive of the at least one first module unit is designed for the movement or for the circulating movement, as the case may be, of the multitude of folding fingers of the at least one first module unit, and where the at least one own drive of the at least one second module unit is designed for the movement or for the circulating movement, as the case may be, of the multitude of folding fingers of the at least one second module unit. The at least one own drive of the at least one first module unit and the at least one own drive of the at least one second module unit can be designed such that the at least one own drive of the at least one first module unit and the at least one own drive of the at least one second module unit are actuatable or operable independently of one another, as the case may be. In particular, it is possible that the at least one first module unit and the at least one second module unit each comprise an own drive unit, with each particular own drive unit comprising at least two own drives. The previously already described first multitude of folding fingers of the particular at least one first module unit or of the at least one second module unit, as the case may be, can be moved in a circulating manner, where applicable, by way of a first drive of a particular drive unit. A second multitude of folding fingers of the particular at least one first module unit or of the at least one second module unit, as the case may be, can be moved in a circulating manner, where applicable, by way of a second drive of a particular drive unit.

It is possible that the at least one first module unit with its at least one own drive and the at least one second module unit with its at least one own drive are designed for carrying out a relative movement, by way of which relative movement the system is convertible or transferable into the second operating mode.

The system can also comprise one or more devices that determine a particular actual position of the multitude of folding fingers of the at least one first module unit and of the multitude of folding fingers of the at least one second module unit, where the at least one own drive of the at least one first module unit and the at least one own drive of the at least one second module unit are controllable, in a manner coordinated to each other and in consideration of the particular determined actual position, for the purpose of the specified relative movement of the multitude of folding fingers of the at least one first module unit in relation to the multitude of folding fingers of the at least one second module unit. Hereby, a multitude of folding fingers of the at least one first module unit can be aligned in relation to a multitude of folding fingers of the at least one second module unit.

Information on a specific target distance of the multitude of folding fingers of the at least one first module unit in relation to the multitude of folding fingers of the at least one second module unit can be stored in a control unit and/or regulating unit. In consideration of the information on the specified target distance, the control unit and/or regulating unit can control the own drives of the at least one first module unit and of the at least one second module unit, where applicable, such that the particular multitude of folding fingers of the at least one first module unit assume the specified target distance in relation to the particular multitude of folding fingers of the at least one second module unit, and, where applicable, maintain it during a movement of the individual articles or article sets as well as during the movement of the planar blanks of packaging material.

The system furthermore comprises one more devices that determine a particular actual position of the multitude of folding fingers of the at least one first module unit and of the multitude of folding fingers of the at least one second module unit, the one or more devices comprising at least one reading device associated with the particular multitude of folding fingers or at least one sensor associated with the particular multitude of folding fingers, and also comprising at least one position sensor/encoder associated with the particular multitude of folding fingers. It is thus conceivable, for example, that the one or more devices that determine a particular actual position of the multitude of folding fingers of the at least one first module unit and of the multitude of folding fingers of the at least one second module unit comprise a plurality of reed switches. A variant of such a position detection system that is particularly simple and economic to realize and that moreover operates very precisely, can provide, for example, that permanent magnets can be associated with the folding fingers, or with individual folding fingers, or with the drive system with the folding fingers, as the case may be, which permanent magnets interact with fixedly installed reed switches, which are switched by the permanent magnets moved past them at close distances and which can thereby supply very precise position information.

In various embodiments, it is conceivable for the system to comprise a multitude of circulatingly guided transport elements for the movement of the particular individual articles or article sets. In this context, it is possible for the individual articles or article sets to be movable in the second operating mode of the system by way of the multitude of circulatingly guided transport elements in contact with the rear ends of the multitude of circulatingly guided transport elements.

It is conceivable that the at least one further module and/or the transfer plate formed as part of the system, where applicable, comprise a horizontal transport surface for the individual articles or article sets. Furthermore, the individual articles or article sets can be moved in the second operating mode in a sliding manner across the horizontal transport surface of the at least one further module and/or the transfer plate formed as part of the system by the multitude of circulatingly guided transport elements, with the transport elements, where applicable, in each instance in contact with the rear ends of the individual articles or article sets.

It is also conceivable that the at least one further module comprises a conveyor belt and an own drive, and that, in the second operating mode of the system, the conveyor belt can be moved in a circulating manner by the own drive for conveying the individual articles or article sets.

It is also possible that the at least one further module is lifted up in vertical direction and/or lowered down in vertical direction for being inserted into the specific operating position. The process of lifting and/or lowering the at least one further module into the specific operating position can be carried out by way of at least one actuator that is coupled to a control unit and/or regulating unit for the purpose of lifting and/or lowering the at least one further module.

The invention moreover relates to a packaging line for individual articles or article sets. The individual articles can also take the form of beverage containers for the packaging line. Furthermore, the article sets can be formed by sets of beverage containers for the packaging line. The packaging line comprises an infeed for the individual articles or article sets. The infeed can comprise at least one horizontal conveying device, by which at least one horizontal conveying device the individual articles or article sets are movable along the packaging line or along a section of the packaging line, as the case may be.

The packaging line furthermore comprises an infeed or transport section for the individual articles or article sets, as the case may be, the transport section following the at least one horizontal conveying device of the infeed and being formed by a system according to an exemplary embodiment of the previous description. A slot can be formed between the at least one horizontal conveying device of the infeed and the transport section, by way of which slot planar blanks of packaging material can be introduced into a transport path of the individual articles or article sets, the transport path extending along the packaging line, and the planar blanks of packaging material having flaps provided for being erected.

At least one horizontal conveying device for articles or article sets is moreover part of the packaging line, with the at least one horizontal conveying device following downstream from the transport section. A further slot can be likewise formed between this at least one horizontal conveying device and the transport section, by way of which further slot planar blanks of packaging material can be introduced into a transport path of the individual articles or article sets, the transport path extending along the packaging line, and these planar blanks of packaging material having no flaps provided for being erected, as the case may be.

A device is furthermore part of the packaging line, by way of which device, optionally and depending on the particular first or second operating mode formed by the system, planar blanks of packaging material can be introduced upstream or downstream from the transport section, in movement direction of the individual articles or article sets, into a transport path formed along the packaging line for the individual articles or article sets.

In this context it is possible that the planar blanks of packaging material are introduced into the transport path of the individual articles or article sets by way of the previously already described slot or the further slot, as the case may be. If the at least one module is inserted in the specific operating position or if the system forms the first operating mode, as the case may be, planar blanks of packaging material, where applicable having flaps provided for being erected or being formed as tray, as the case may be, can be introduced into the transport path of the individual articles or article sets by way of the slot formed between the infeed or the at least one horizontal conveying device of the infeed, as the case may be, and the at least one first module.

If the at least one further module is inserted in the specific operating position and/or the transfer plate is placed on the at least one first module or if the system is in the second operating mode, as the case may be, planar blanks of packaging material, where applicable, having no flaps provided for being erected, can be introduced into the transport path of the individual articles or article sets by way of the slot formed between the at least one second module or the transfer plate, as the case may be, and, where applicable, the at least one horizontal conveying device following the transport section or following the at least one second module, as the case may be.

The invention moreover relates to a method for modifying or converting a packaging line provided for articles or article sets. Features that have already been described above regarding various embodiments of the apparatus or of the packaging line, as the case may be, can likewise be provided for the method described as follows, and they are therefore not redundantly mentioned herein. Features, which will be described below regarding various embodiments of the method, can likewise be provided for the previously already described apparatus or for the previously already described packaging line, as the case may be.

A first step of the method provides transporting articles or article sets by way of at least one module in a first operating mode of the packaging line, the at least one module having at least two individual module units cooperating with each other in the first operating mode, the at least one module being aligned to a transport of individual articles or article sets provided for a first packaging type, and the at least one module in the first operating mode forming a transport section of the packaging line.

The method according to the according to the invention furthermore provides a particular movement of the at least two individual module units, with the result of the transport section being converted or adapted for a second operating mode of the packaging line, the second operating mode being aligned to a transport of individual articles or article sets provided for a second packaging type that differs from the first packaging type.

In preferred embodiments, it is possible that at least one first module unit and at least one second module unit of the at least one first module each form a multitude of preferably circulatingly guided folding fingers, with the multitude of preferably circulatingly guided folding fingers of the at least one first module unit and the multitude of preferably circulatingly guided folding fingers of the at least one second module unit in the first operating mode erecting flaps of blanks of packaging material that are in contact with the individual articles or article sets. The at least one first module can be in the transport section or in the previously already mentioned specific operating position, as the case may be, temporally while the flaps of blanks of packaging material that are in contact with individual articles or article sets are being erected.

The multitude of folding fingers of the at least one first module unit can be in contact with at least one chain that is driven in a circulating manner for the circulating movement of the multitude of folding fingers of the at least one first module unit. The multitude of folding fingers of the at least one second module unit can likewise be in contact with at least one further chain that is driven in a circulating manner for the circulating movement of the multitude of folding fingers of the at least one second module unit.

It is conceivable that the two individual module units are moved in each instance downward for converting or adapting the transport section for the second operating mode. Furthermore, a transfer plate can be placed onto the two individual module units temporally after the particular downward movement. Individual articles or article sets that are provided for the second packaging type can be moved preferably in the second operating mode in a sliding manner along the transfer plate that is placed on the at least two individual module units.

It is possible that the at least two individual module units are moved relative to each other in each instance in horizontal direction and hereby the transport section between them is cleared for inserting the at least one second module.

It is also possible that the at least two individual module units are moved relative to each other, with the at least two individual module units leaving the transport section, and temporally thereupon at least one further module being inserted into the transport section. The at least one further module can move individual articles or article sets provided for the second packaging type in the transport section of the packaging line along the transport section.

It is furthermore possible that the at least two module units are transferred by the particular relative movement toward waiting positions disposed on oppositely located sides of the transport section, whereupon the at least one second module is inserted into the transport section. The at least two module units can remain in their particular waiting position while the at least one second module is being inserted into the transport section and/or while individual articles or article sets provided for a second packaging type are being transported by the at least one second module inserted in the transport section. Thus, the at least two module units can remain in their particular waiting position temporally during the second operating mode.

Furthermore, it is possible that the at least two module units are moved in each instance in horizontal direction and relative to each other while they are mechanically coupled to a linear guiding device.

Embodiments have moreover proved successful, in which the multitude of folding fingers of the at least one first module unit and the multitude of folding fingers of the at least one second module unit are moved in a circulating manner by way of a particular own drive temporally before the transport section is cleared. It is moreover possible that the own drive of the at least one first module unit and the own drive of the at least one second module unit are moved relative to each other together with the particular module unit, with the result that at least one first module is removed from the transport section and the transport section is cleared for the at least one second module to be inserted and/or the transport section is thereby converted or adapted for the second operating mode of the packaging line.

It is also conceivable that a particular actual position of individual, circulatingly moved folding fingers from the multitude of folding fingers of at least one first module unit and a particular actual position of individual, circulatingly moved folding fingers from the multitude of folding fingers of the at least one second module unit is determined and/or identified. Furthermore, the own drives of the at least one first module unit and of the at least one second module unit can be controlled in consideration of the detected actual positions for the purpose of the specified aligning of the multitude of individual folding fingers of the at least one first module unit in relation to the multitude of folding fingers of the at least one second module unit.

In this context it is provided, for example, that the particular actual position is determined and/or identified by at least one reading device or suitable sensor and at least one suitable position sensor/encoder, where the at least one reading device or the at least one sensor and the at least one position sensor/encoder can be formed by or can be, as the case may be, for example, at least one system made from permanent magnets as position sensors/encoders and at least one reed switch as sensor or reader. The at least one first module unit and/or the at least one second module unit can in each instance comprise a first multitude of circulatingly moved folding fingers and a second multitude of circulatingly moved folding fingers. The particular first multitude of circulatingly moved folding fingers and the particular second multitude of circulatingly moved folding fingers can be guided parallel to each other. In this context it is conceivable that the particular actual position of individual folding fingers of the first multitude of circulatingly moved folding fingers as well as a particular actual position of individual folding fingers of the second multitude of circulatingly moved folding fingers is detected and/or identified. The particular first multitude of circulatingly moved folding fingers can then be brought into a specified alignment or into a specified relative spacing, as the case may be, in relation to the particular second multitude of circulatingly moved folding fingers. For this purpose, the at least one first module unit and/or the at least one second module unit can have a particular drive unit, which particular drive unit in each instance comprises at least two drives for the independent, circulating movement of the first multitude of folding fingers in relation to the second multitude of folding fingers. The first multitude of folding fingers of the at least one first or of the at least one second module unit, as the case may be, can be formed for erecting front flaps or preceding flaps, as the case may be, of planar blanks of packaging material. The second multitude of folding fingers of the at least one first or of the at least one second module unit, as the case may be, can moreover be formed for erecting back flaps or preceding flaps, as the case may be, of planar blanks of packaging material.

It is moreover conceivable that, after the transport section has been cleared, the at least one second module is inserted into the transport section, and temporally thereupon, with the at least one second module having been inserted in the transport section, a multitude of circulatingly guided transport elements moves individual articles or article sets, in a sliding manner and preferably in each instance in contact with the rear ends of the individual articles or article sets, across a horizontal transport surface that is formed as part of the at least one second module that is inserted in the transport section.

It is additionally conceivable that, after the transport section has been cleared, the at least one second module is inserted into the transport section, whereupon the individual articles or article sets are moved standing on a circulatingly driven conveyor belt of the at least one second module that has been inserted in the transport section.

It is also conceivable that, after the transport section has been cleared, the at least one second module is inserted into the transport section by a lifting movement oriented in vertical direction or by a lowering movement oriented in vertical direction.

BRIEF DESCRIPTION OF THE FIGURES

In the following passages, the attached figures further illustrate exemplary embodiments of the invention and their advantages. The size ratios of the individual elements in the figures do not necessarily reflect the real size ratios. It is to be understood that in some instances various aspects of the invention may be shown exaggerated or enlarged in relation to other elements to facilitate an understanding of the invention.

Figure 1:
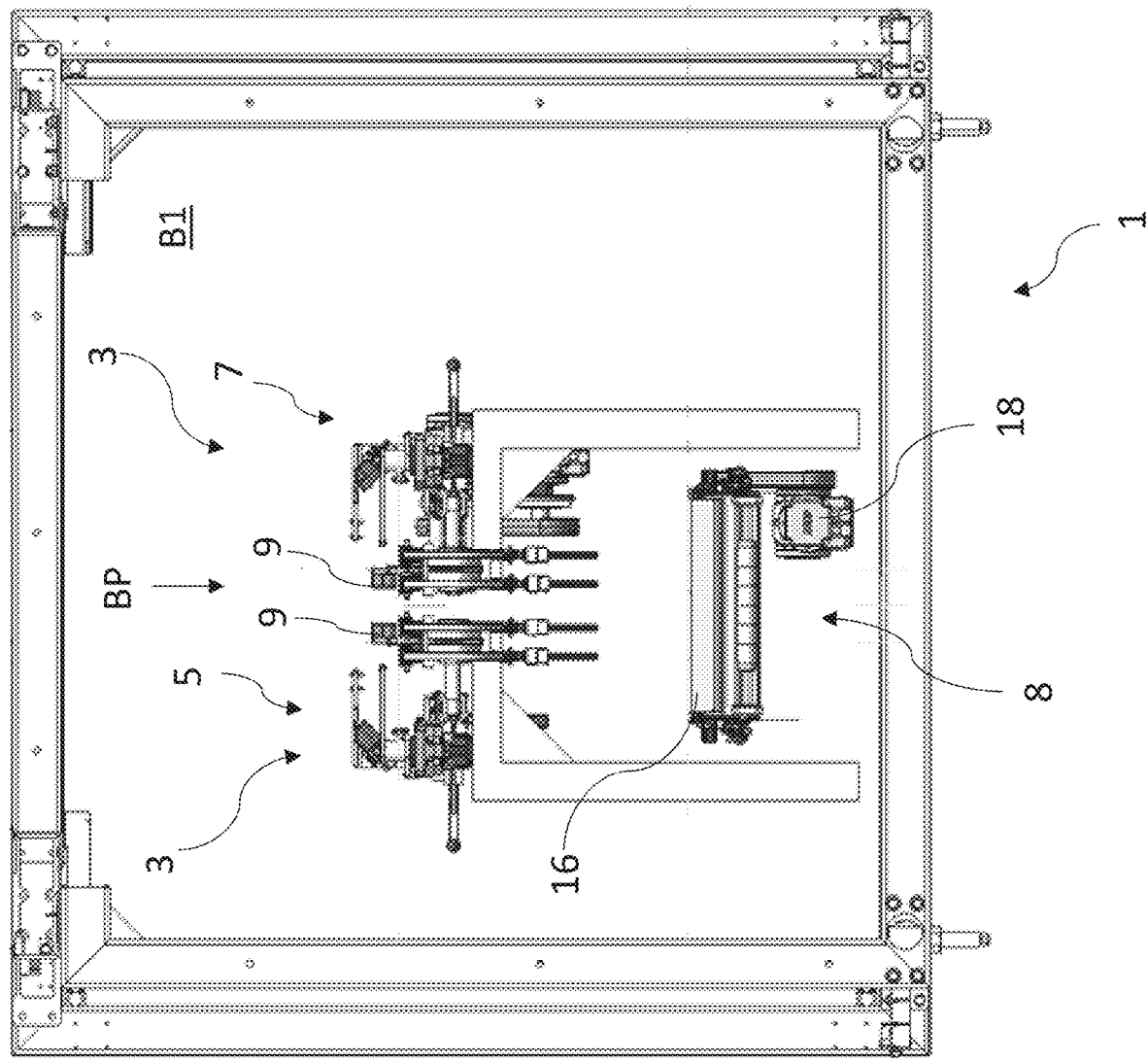
FIG. 1 shows a schematic view of a first embodiment of a system according to the invention.

The same or equivalent elements of the invention are designated using identical reference characters. Furthermore and for the sake of clarity, only the reference characters relevant for describing the individual figures are provided. It should be understood that the detailed description and specific examples, while indicating preferred embodiments, are intended for purposes of illustration only and are not intended to limit the scope of the invention. The features of the exemplary embodiments explained below are in each instance intended in a general context and are not strictly limited to the specific exemplary embodiment.

DETAILED DESCRIPTION OF THE INVENTION

The schematic view of FIG. 1 shows a first embodiment of a system 1 according to the invention. The system 1 is provided for forming a transport section for a packaging line. For this purpose, the system 1 comprises a first module 3 and a second module 8, with the first module 3 and the second module 8 being insertable optionally into the transport section or into a specific operating position BP formed along the transport section, as the case may be. In FIG. 1, the second module 8 is disposed in a waiting position below a transport level formed for the transport of the individual articles or article sets by the first module 3 inserted in the operating position BP.

The individual articles or article sets, as the case may be, which the system 1 can move or handle, as the case may be, can be formed by beverage containers and, in particular, by groups of a plurality of beverage containers to be assembled to a particular bundle. For the purpose of clarity, the individual articles or article sets, as the case may be, are not illustrated in the figures of the present patent application. The individual articles or article sets can be moved by way of the system 1 in direction toward the image plane.

The second module 8, which is in the waiting position in FIG. 1 or disposed below the first module 3 that is inserted in the specific operating position BP, as the case may be, is provided for the transport of individual articles or article sets, which are to be placed onto a blank of packaging material taking the form of a pad. As will be described below, the second module 8 is for this purpose inserted into the specific operating position BP, whereupon the individual articles or article sets are moved along the second module 8 by a conveyor belt 16 that is formed as part of the second module 8, and, at least approximately immediately on leaving the second module 8, the individual articles or article sets move onto a particular blank of packaging material taking the form of a pad.

A particular pad can form a horizontal standing surface for a particular individual article or for a particular article set, and in practice, it has no flaps that could be transferred into an erect orientation for a lateral contact with a particular individual article or with a particular article set, as the case may be. In this context, a horizontal conveying device can follow downstream to the conveyor belt 16 of the second module 8 inserted in the specific operating position BP, where applicable, thereby forming a slot. The blanks of packaging material taking the form of pads can be introduced into the transport path of the individual articles or article sets by way of the slot formed between the conveyor belt 16 and the horizontal conveying device.

As already mentioned above, the second module 8 is in waiting position in FIG. 1, whereas the first module 3 has been inserted in the specific operating position BP and can move individual articles or article sets in the operating position BP in direction toward the image plane. The first module 3 is aligned to a transport of individual articles or article sets that are already standing on a particular blank of planar packaging material in the form of a tray while they are being transported by way of the first module 3 that is inserted in the specific operating position BP. The first module 3 furthermore comprises a first module unit 5 and a second module unit 7, which modules are in contact with each other or which interact with each other, as the case may be, in the specific operating position BP for transporting the individual articles standing on a particular tray or the article sets standing on a particular tray.

Both the first module unit 5 and the second module unit 7 for this purpose each comprise a plurality of circulatingly guided folding fingers 9 by which front flaps and back flaps of a particular tray can be erected during a movement of the individual articles or article sets standing on the particular tray. The first module 3 is therefore aligned to individual articles or article sets to which blanks of packaging material in each instance taking the form of trays are to be applied. If the first module 3 is in the specific operating position BP as shown in FIG. 1, the system 1 has been brought into a first operating mode B1, in which the system 1 can transport individual articles or article sets in direction toward the image plane and can erect flaps of blanks of packaging material.

Furthermore, the second module 8 is aligned to individual articles or article sets that are to be placed onto a particular blank of packaging material designed as pad without front or back flaps to be erected. The first module 3 is thus aligned to a transport of individual articles or article sets provided for a first packaging type, whereas the second module 8 is aligned to a transport of individual articles or article sets provided for a second packaging type, with the second packaging type differing from the first packaging type.

From FIG. 1 it is moreover discernible that the first module unit 5 and the second module unit 7 of the first module 3 in the specific operating position BP or in the transport section of the packaging line, as the case may be, have assumed a specified relative position to each other, in which specified relative position the first module unit 5 cooperates with the second module unit 7, with the first module unit 5 and the second module unit 7 in this context moving individual articles or article sets and erecting the front and back flaps of a particular blank of packaging material while the individual articles or article sets standing on the particular blanks are being moved. In this instance, the first module unit 5 and the second module unit 7 in the first operating mode B1 of the embodiment illustrated in FIG. 1 are not mechanically coupled to each other. Furthermore, the first module unit 5 and the second module unit 7 each comprise a pair of own drives 15, with each particular pair of own drives 15 being provided for the circulating movement of the folding fingers 9 formed as part of the particular first module unit 5 or second module unit 7, as the case may be, and each pair forming a drive unit 32 (cf. FIG. 4).

In addition, a plurality of position sensors/encoders can be part of the system 1, which position sensors/encoders can each be mechanically fastened to at least one folding finger 9 from a multitude of folding fingers 9 of the first module unit 5 and of the second module unit 7, the folding fingers 9 being in each instance moved in a circulating manner in a row. The position sensors/encoders can be of simple construction and in each instance formed as permanent magnets, for example. The system 1 moreover comprises a reading device or a suitable sensor (not illustrated here), which the position sensors/encoders or permanent magnets, as the case may be, pass in the circulating movement of the particular multitude of folding fingers 9. A possible reading device or sensor of simple construction can be a reed switch, for example, which is activated by the permanent magnets and thereby can supply very precise position information by a simple switch signal. The reading device or the sensor is in contact with a control unit and/or regulating unit that can, upon identifying a position sensor/encoder or a permanent magnet, as the case may be, determine or identify, as the case may be, the particular actual position of the individual folding fingers 9 of a multitude of folding fingers 9 being in each instance moved in a circulating manner in a row. Depending on the actual positions identified by way of the control unit and/or regulating unit, the drive units 32 of the first module unit 5 and of the second module unit 7 are then controlled to transfer the folding fingers 9 of the first module unit 5 in relation to the folding fingers 9 of the second module unit 7 into a suitable relative position for erecting front and back flaps of a particular blank of packaging material by way of folding fingers 9 of the first module unit 5 and folding fingers 9 of the second module unit 7. The particular relative positions include the particular folding fingers 9 of the first module unit 5 and the particular folding fingers 9 of the second module unit 7 during a surface contact with flaps of a particular blank of packaging material and during a movement of the particular blank of packaging material, and also include the individual articles or article sets standing on this blank of packaging material.

Figure 2:
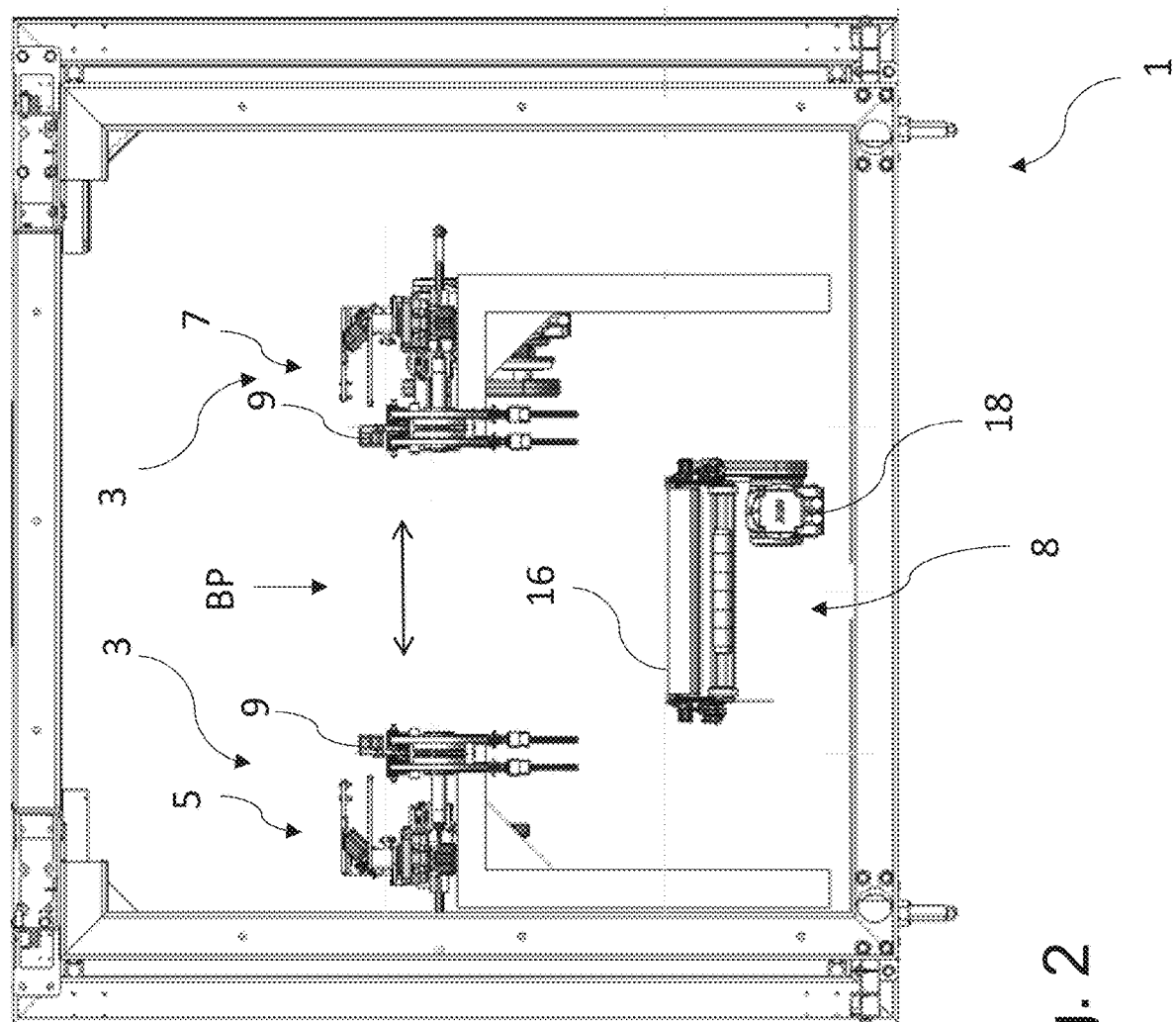
FIG. 2 shows a schematic view of the embodiment from FIG. 1, with further aspects being illustrated.

The schematic view of FIG. 2 shows the embodiment of a system 1 from FIG. 1, with further aspects being illustrated. Furthermore, the first module 3 with the first module unit 5 and the second module unit 7 is illustrated in FIG. 2. Additionally discernible is the second module 8 with its position unchanged in relation to FIG. 1 or in the waiting position as already described with FIG. 1, which waiting position is at a lower vertical height level in relation to the first module 3.

As indicated in FIG. 2 by arrow-based illustration, the first module unit 5 and the second module unit 7 were moved relative to each other and in this context each moved in horizontal direction, resulting in the transport section previously assumed by the first module 3 or in the specific operating position BP previously assumed by the first module 3 being cleared for inserting the second module 8. In connection with the relative movement, the first module unit 5 and the second module unit 7 are horizontally moved in relation to each other; they are, however, not lifted up or lowered down in vertical direction. In this context, both the first module unit 5 and the second module unit 7 are each moved laterally away from the specific operating position BP such that the first module unit 5 and the second module unit 7 each leave the transport section or the specific operating position BP, as the case may be. After the movement of the first module unit 5 and of the second module unit 7 relative to each other, the first module unit 5 and the second module unit 7 of the specific operating position BP or of the transport section, as the case may be, are adjacently located on opposite sides. The movement of the first module unit 5 and of the second module unit 7 relative to each other can be caused actuatorily and prompted by a control unit and/or regulating unit, where applicable.

The previously mentioned drive unit 32, which is formed as part of the first module unit 5 or of the second module unit 7, as the case may be, and provided for the circulating movement of the folding fingers 9, is removed from the specific operating position BP together with the first module unit 5 or with the second module unit 7, as the case may be. If the first module unit 5 and the second module unit 7 are to be inserted into the specific operating position BP again, the particular drive unit 32, which is formed as part of the first module unit 5 or of the second module unit 7, as the case may be, and provided for the circulating movement of the particular multitude of folding fingers 9, can be again transferred together with the particular first module unit 5 or with the second module unit 7, as the case may be, into the specific operating position BP. In this way, the tedious establishing of a mechanical coupling between an actuator and the first and second module units 5 or 7, respectively, after having been inserted in the specific operating position BP is not required, such that the first module 3 can be again inserted into the specific operating position BP, in a time-optimized and simple manner, after removal or after clearing the operating position BP, as the case may be.

The second module 8 likewise comprises an own actuator 18, which is provided for driving the conveyor belt 16 that is formed as part of the second module 8. The own actuator 18 of the second module 8 is a fixed part of the second module 8 and can thus be inserted together with the second module 8 into the specific operating position BP and removed together with the second module 8 from the specific operating position BP. With regard to the second module 8, it is therefore also not necessary to form a mechanical coupling for driving the conveyor belt 16 after transferring or inserting, as the case may be, the second module 8 into the specific operating position BP. Inserting the second module 8 into the specific operating position BP or into the transport section, as the case may be, can therefore be carried out simply and with low time requirement.

Figure 3:
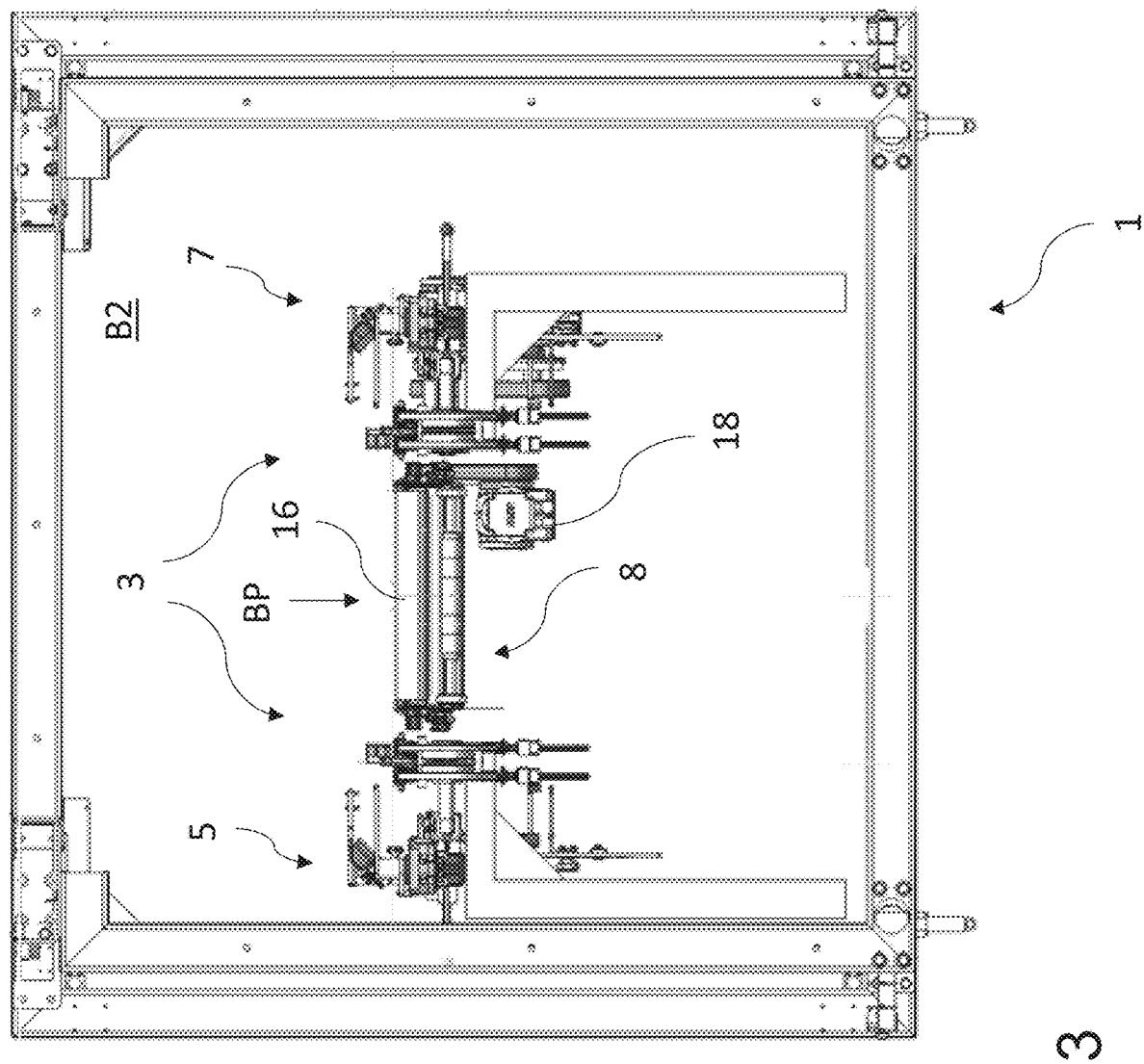
FIG. 3 shows a schematic view of the embodiment of the system from the FIGS. 1 and 2, with the second module having been inserted in the operating position or in the transport section, as the case may be.

FIG. 3 shows a schematic view of the embodiment of the system 1 from the FIGS. 1 and 2, with the second module 8 having been inserted in the specific operating position BP or in the transport section, as the case may be, and with the system 1 being in a second operating mode B2. In this context, FIGS. 2 and 3 in conjunction show that, after the transport section or the specific operating position BP have been cleared, as the case may be, the first module unit 5 and the second module unit 7 remain disposed in a particular waiting position formed laterally from the transport section or from the specific operating position BP, as the case may be. FIGS. 2 and 3 in conjunction furthermore illustrate that the second module 8 is lifted in vertical direction without horizontal movement together with the conveyor belt 16 formed as part of the second module 8, and that the second module hereby passes on into the specific operating position BP or into the transport section, as the case may be. For further embodiments it is likewise conceivable that the second module 8 is lowered in vertical direction without horizontal movement and hereby passes on into the specific operating position BP. A waiting position for the second module 8 can in this context be located above the specific operating position BP.

If the second module 8 is in the specific operating position BP, the conveyor belt 16 provides a horizontal transport level, along which the individual articles or article sets are moved by the circulating drive of the conveyor belt 16 by way of the own actuator 18 of the second module 8. In particular, the second module 8 can be formed or prepared, as the case may be, to first move individual articles or article sets without a particular blank of packaging material by the conveyor belt 16. In an end section of the conveyor belt 16 or of the second module 8, as the case may be, the individual articles or article sets can then move onto a particular blank of packaging material or onto a particular pad, as the case may be, and can pass over onto a horizontal conveying device, if applicable, after moving onto the particular blank of packaging material or onto the particular pad.

For the sake of completeness, it should moreover be noted that in practice embodiments have also proved successful, in which, for the purpose of converting or transferring the system 1 into a second operating mode B2, the first module unit 5 and the second module unit 7 are lowered in vertical direction from the position according to FIG. 1. Subsequently, a transfer plate can be placed onto the first module unit 5 and onto the second module unit 7, with the first module unit 5 and the second module unit 7 together supporting the transfer plate. In the second operating mode B2, individual articles or article sets that are provided for the second packaging type can then be moved in a sliding manner along the transfer plate. For this purpose, circulating transport elements can be provided, where applicable, which come into contact with the rear ends of the individual articles or article sets, and which push the individual articles or article sets across the transfer plate in the second operating mode.

Figure 4:
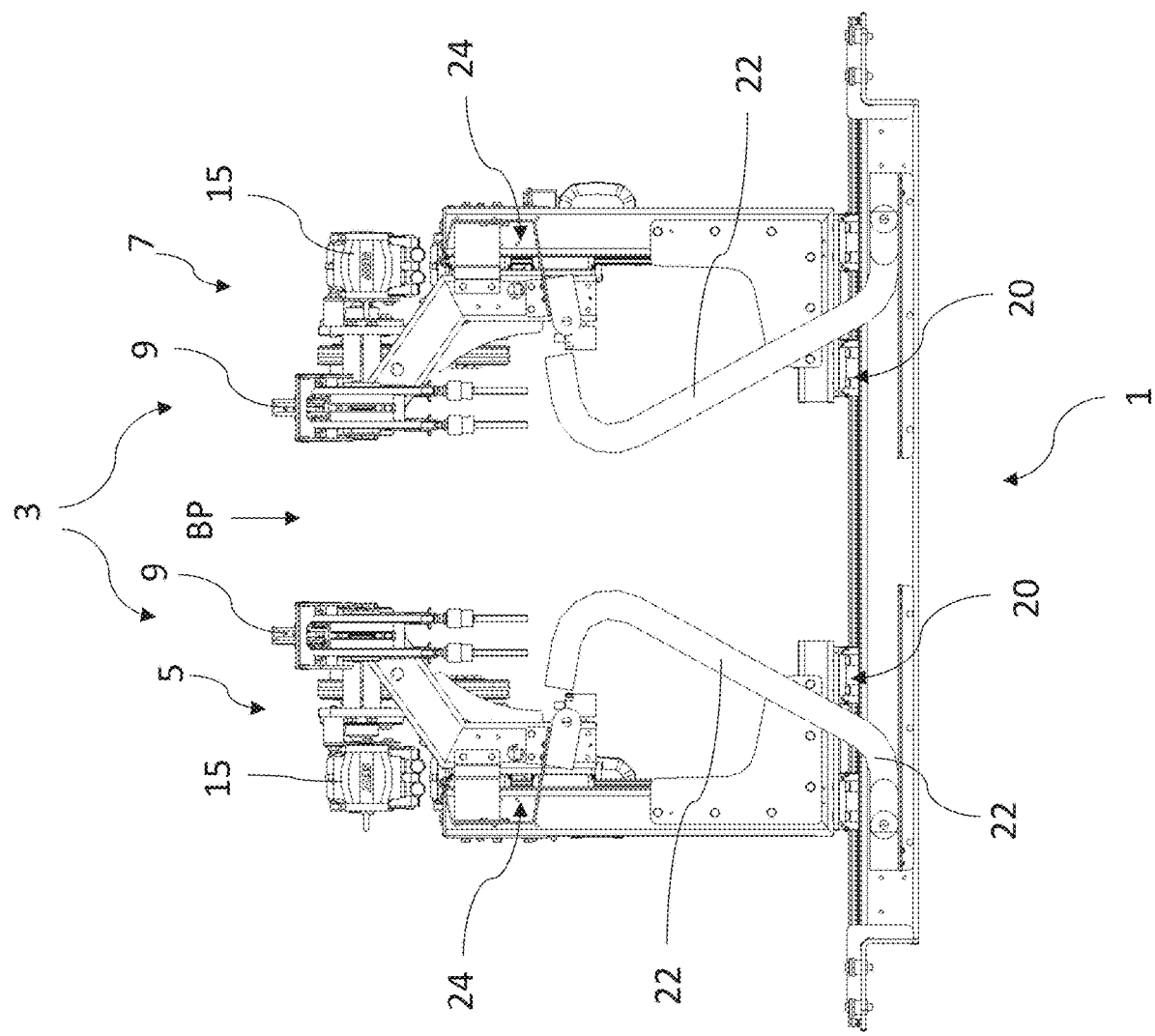
FIG. 4 shows a schematic view of a further embodiment of a system according to the invention.

FIG. 4 shows a schematic view of a further embodiment of a system 1 according to the invention. A further embodiment for the first module unit 5 and the second module unit 7 are discernible in FIG. 4.

Figure 5:
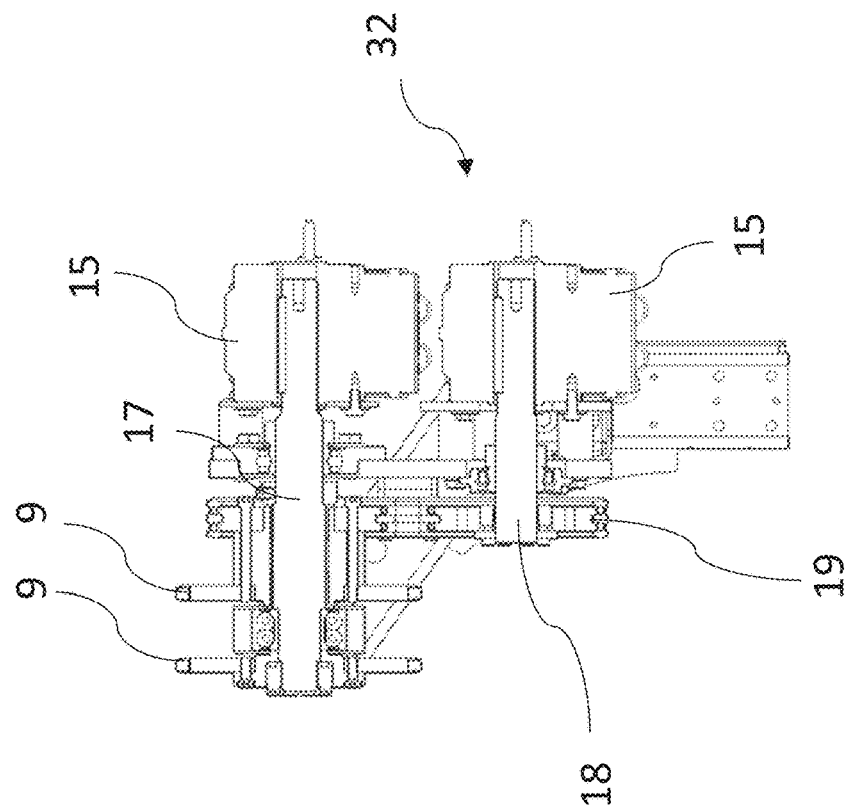
FIG. 5 shows a schematic sectional view of the embodiment of the system from FIG. 4.
Figure 5:
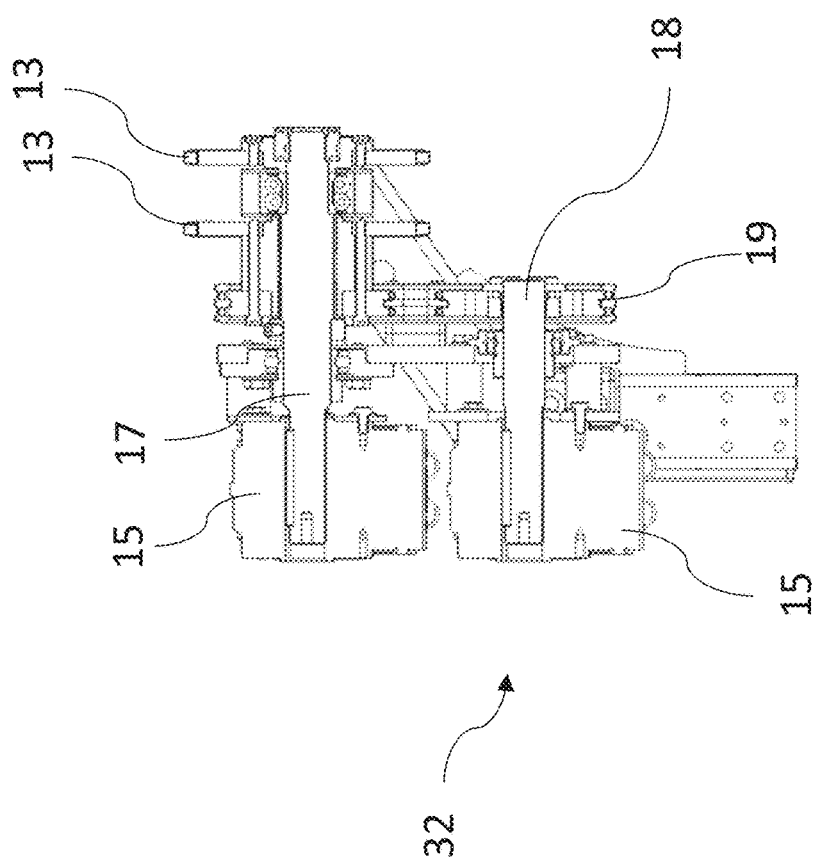

The first module unit 5 and the second module unit 7 each comprise two own drives 15, of which in each instance one drive 15 is discernible in FIG. 4, and which in each instance two own drives 15 form a drive unit 32 (cf. FIG. 5). A multitude of folding fingers 9 can in each instance be moved in a circulating manner by way of the own drives 15 of the drive units 32. In this way, a first multitude of folding fingers 9 and a second multitude of folding fingers 9 of the first module unit 5 are each moved in a circulating manner by way of the own drives 15 of the first module unit 5, with the first multitude and the second multitude of folding fingers 9 of the first module unit 5 being guided parallel to each other. A first multitude of folding fingers 9 and a second multitude of folding fingers 9 of the second module unit 7 are each likewise moved in a circulating manner by way of the own drives 15 of the second module unit 7, with the first multitude and the second multitude of folding fingers 9 of the second module unit 7 being guided parallel to each other.

The system 1 from FIG. 4 moreover comprises a linear guiding device 20, along which the first module unit 5 and the second module unit 7 are movable for carrying out a horizontal relative movement resulting in clearing the specific operating position BP. The movement of the first module unit 5 and of the second module unit 7 along the linear guiding device 20 can be effected by way of an actuator (not illustrated in FIG. 4). Reference character 22 indicates an energy chain, in which electric line connections associated with the particular drive unit 32 run, or in which electric line connections associated with the particular drive unit 32 are disposed. Pneumatic line connections can also run in the energy chain 22.

Furthermore, two vertical linear guiding device 24 are discernible in FIG. 4, with the first module unit 5 being mechanically coupled to the vertical linear guiding device 24 shown on the left side, and with the second module unit 7 being mechanically coupled to the vertical linear guiding device 24 shown on the right, in each instance for the purpose of a perpendicular movement. The first module unit 5 and the second module unit 7 can thus each be lifted up and lowered down perpendicularly along their particular vertical linear guiding device 24. In the illustration of FIG. 4, the first module unit 5 and the second module unit 7 have already been partly removed from the specific operating position BP and are now disposed in a waiting position, where the folding fingers 9 of the first module unit 5 and of the second module unit 7 are not provided for erecting flaps of blanks formed by packaging material. A transfer plate that is not illustrated in FIG. 4 can now be placed onto the first module unit 5 that has been transferred into the waiting position as well as onto the second module unit 7, such that the first module unit 5 and the second module unit 7 support the transfer plate. The individual articles or article sets can then be moved, in a sliding manner and by way of transport elements that are brought, where applicable, into contact with the rear ends of the individual articles or article sets, along the transfer plate that has been placed on the first module unit 5 and on the second module unit 7.

If flaps on blanks or trays formed by packaging material, as the case may be, are subsequently to be erected by the particular multitude of folding fingers 9 of the first module unit 5 and of the second module unit 7, the transfer plate that has been placed on the first module unit 5 and on the second module unit 7 is first removed from the first module unit 5 and from the second module unit 7. Temporally thereafter, the first module unit 5 and the second module unit 7 are moved in horizontal direction relative to each other along the linear guiding device 20, with the first module unit 5 and the second module unit 7 drawing closer to each other in this connection and passing over into the specific operating position BP. The first module unit 5 and the second module unit 7 are also lifted up or lowered down in perpendicular direction along the vertical linear guiding device 24, whereupon the first module unit 5 and the second module unit 7, in the specific operating position BP, erect flaps of blanks of packaging material by way of their particular multitude of folding fingers 9, and they are moved in a circulating manner for this purpose.

FIG. 5 shows a schematic sectional view of the embodiment of a system 1 from FIG. 4. In FIG. 5, the drive units 32 of the first module unit 5 and of the second module unit 7 are now discernible, which drive units 32 each consist of two drives 15 for the particular circulating movement of a particular multitude of folding fingers 9. In this way, the particular multitude of folding fingers 9 (not illustrated in FIG. 5) is moved in a circulating manner by the inside drive sprockets 13 by way of the in each instance topmost illustrated drive 15 of the first module unit 5 and of the second module unit 7 (cf. FIG. 4). The particular shaft 18 is in each instance driven by way of the particular lowermost drive 15 of the first module unit 5 and of the second module unit 7, with the shaft 18 transferring a rotating movement via the chain 19 to a circulating movement of the particular multitude of folding fingers 9 from the multitude of folding fingers 9 that are in each instance in contact with the outer drive sprockets 13.

The invention has been described with reference to a preferred embodiment. Those skilled in the art will appreciate that numerous changes and modifications can be made to the preferred embodiments of the invention and that such changes and modifications can be made without departing from the spirit of the invention. It is therefore intended that the appended claims cover all such equivalent variations as fall within the true spirit and scope of the invention.

LIST OF REFERENCE CHARACTERS

1 System
3 First module
5 First module unit
7 Second module unit
8 Further or Second module
9 Folding finger
13 Drive sprocket
15 Drive
16 Conveyor belt
17 Shaft
18 Shaft
19 Chain
20 Linear guiding device
22 Energy chain
24 Vertical linear guiding device
32 Drive unit
BP Specific operating position
B1 First operating mode
B2 Second operating mode

The invention claimed is:

1. A system (1) for forming a transport section of a packaging line and for converting the transport section for individual articles or article sets with different packaging types, the system comprising:
　at least one module (3) having at least two individual module units (5, 7), wherein the at least two individual module units (5, 7) cooperate with each other in a first operating mode (B1) for the transport of individual articles or article sets having a first packaging type,
　wherein the at least two individual module units (5, 7) are each movable, and wherein the movement of the at least two individual module units (5, 7) convert into a second operating mode (B2) for the transport of individual articles or article sets having a second packaging type, wherein the second packaging type differs from the first packaging type,
　wherein each of the at least one first individual module unit (5) and at least one second individual module unit (7) form or comprise: a plurality of folding fingers (9) moved by a chain (19) and at least one own drive (15) for circulating movement of the chain (19), wherein the at least one own drive (15) of the at least one first individual module unit (5) and the at least one own drive (15) of the at least one second individual module unit (7) are separate from each other and can be operated independently of one another.

2. The system of claim 1, wherein the at least two individual module units (5, 7) are downwardly movable into the second operating mode (B2).

3. The system of claim 2, further comprising at least one vertical linear guiding device (24) to which the at least two individual module units (5, 7) are mechanically coupled.

4. The system of claim 3, further comprising at least one further module (8) for the transport of individual articles or article sets provided for the second packaging type, wherein the at least two individual module units (5, 7) of the at least one first module (3) are movable relative to each other, and wherein the at least one further module (8) can be inserted for the second operating mode (B2) into an operating position (BP) cleared by the movement of the at least two individual module units (5, 7) relative to each other.

5. The system of claim 4, wherein the at least one further module (8) comprises a conveyor belt (16) and an own drive (18), wherein, in the second operating mode (B2), the conveyor belt (16) can be moved in a circulating manner by the own drive (18) for conveying the individual articles or article sets.

6. The system of claim 1, wherein the at least one first individual module unit (5) and the at least one second individual module unit (7) move into the second operating mode (B2).

7. The system of claim 6, further comprising one or more devices that determine an actual position of the plurality of folding fingers (9) of the at least one first individual module unit (5) and of the plurality of folding fingers (9) of the at least one second individual module unit (7), wherein the at least one own drive (15) of the at least one first individual module unit (5) and the at least one own drive (15) of the at least one second individual module unit (7) are controllable, in a manner coordinated to each other and in consideration of the determined actual position, for the purpose of the specified relative movement of the plurality of folding fingers (9) of the at least one first individual module unit (5) in relation to the plurality of folding fingers (9) of the at least one second individual module unit (7).

8. The system of claim 7, wherein the one or more devices that determine an actual position of the plurality of folding fingers (9) of the at least one first individual module unit (5) and of the plurality of folding fingers of the at least one second individual module unit (7) comprise at least one reading device associated with the plurality of folding fingers (9) or at least one sensor associated with the plurality of folding fingers (9) and also comprises at least one position sensor and/or encoder associated with the plurality of folding fingers (9).

9. The system of claim 8, further comprising a plurality of circulatingly guided transport elements for moving the individual articles or article sets, wherein, in the second operating mode (B2), the individual articles or article sets are movable by the plurality of circulatingly guided transport elements, with the rear ends of the individual articles or article sets in contact with the plurality of circulatingly guided transport elements.

10. The system (1) of claim 1 wherein at least the at least one first individual module unit (5) comprises a first multitude of folding fingers moved by a first chain and a second multitude of folding fingers moved by a second chain.

11. A method for modifying a packaging line provided for articles or article sets, the method comprising the following steps:
transporting articles or article sets by at least one module (3) in a first operating mode (B1), the at least one module (3) having at least two individual module units (5, 7) wherein the at least two individual module units (5, 7) cooperate with each other in the first operating mode (B1) for the transport of individual articles or article sets having a first packaging type, and the at least one module (3) in the first operating mode (B1) forming a transport section;
moving the at least two individual module units (5, 7) with the result being the transport section converted to a second operating mode (B2), wherein the second operating mode (B2) is for the transport of individual articles or article sets having a second packaging type that differs from the first packaging type,
operating independently of one another at least one own drive (15) of at least one first individual module unit (5) and at least one own drive (15) of at least one second individual module unit (7), wherein each of the at least one first individual module unit (5) and the at least one second individual module unit (7) form or comprise: a plurality of folding fingers (9) moved by a chain (19) and the at least one own drive (15) for circulating movement of the chain (19).

12. The method of claim 11, further comprising moving each of the two individual module units (5, 7) downward for converting the transport section for the second operating mode (B2), and wherein, temporally after the downward movement, placing a transfer plate onto the two individual module units (5, 7), and then moving individual articles or article sets provided for a second packaging type in a sliding manner along the transfer plate.

13. The method of claim 12, moving the at least two individual module units (5, 7) relative to each other, wherein at least one of the at least two individual module units (5, 7) leaves the transport section, and thereafter inserting at least one further module (8) into the transport section, wherein the at least one further module (8) in the transport section moves individual articles or article sets having the second packaging type.

14. The method claim 13, wherein the at least two individual module units (5, 7) each comprise at least one own drive (15) and each moving to convert the transport section for the second operating mode (B2).

15. The method of claim 14, further comprising moving each of the at least two individual module units (5, 7) toward waiting positions disposed at oppositely located sides of the transport section, whereupon inserting the at least one further module (8) into the transport section, and wherein the at least two individual module units (5, 7) remain in their waiting position while the further module (8) is being inserted into the transport section and/or while individual articles or article sets having the second packaging type are being transported by the at least one further module (8).

16. The method of claim 15, wherein the plurality of circulatingly moved folding fingers (9) of the at least one first and second individual module units (5, 7) in the first operating mode (B1) erect flaps of blanks of packaging material that are in contact with the individual articles or article sets.

17. The method of claim 16, further comprising moving, in the first operating mode (B1), the plurality of circulatingly moved folding fingers (9) of the at least one first module unit (5) and the plurality of circulatingly moved folding fingers (9) of the at least one second individual module unit (7), and wherein moving the own drive (15) of the at least one first module unit (5) and the own drive (15) of the at least one second individual module unit (7) converts the at least one module (3) to the second operating mode (B2).

18. The method of claim 17, further comprising determining or identifying an actual position of individual circulatingly moved folding fingers (9) from the plurality of folding fingers (9) of the at least one first individual module unit (5) and an actual position of individual circulatingly moved folding fingers (9) from the plurality of folding fingers (9) of the at least one second individual module unit (7), and controlling the own drives (15) of the at least one first individual module unit (5) and of the at least one second individual module unit (7) to achieve alignment of the plurality of individual folding fingers (9) of the at least one first individual module unit (5) relative to the plurality of folding fingers (9) of the at least one second individual module unit (7).

19. The method of claim 18, wherein the determining or identifying step comprises using at least one reading device or at least one sensor or at least one position sensor/encoder, wherein the at least one reading device or the at least one sensor or the at least one position sensor/encoder comprise magnetically active position sensors/encoders and one reed switch.

20. The method of claim 11 wherein at least the at least one first individual module unit (5) comprises a first multitude of folding fingers moved by a first chain and a second multitude of folding fingers moved by a second chain.

21. A method for modifying a packaging line provided for articles or article sets, the method comprising the following steps:
    transporting articles or article sets by at least one module (3) in a first operating mode (B1), the at least one module (3) having at least two individual module units (5, 7) wherein the at least two individual module units (5, 7) cooperate with each other in the first operating mode (B1) for the transport of individual articles or article sets having a first packaging type, and the at least one module (3) in the first operating mode (B1) forming a transport section;
    moving the at least two individual module units (5, 7) with the result being the transport section converted to a second operating mode (B2), wherein the second operating mode (B2) is for the transport of individual articles or article sets having a second packaging type that differs from the first packaging type,
    operating independently of one another at least one own drive (15) of at least one first individual module unit (5) and at least one own drive (15) of at least one second individual module unit (7), wherein each of the at least one first individual module unit (5) and the at least one second individual module unit (7) form or comprise: a plurality of folding fingers (9) moved by a chain (19) and the at least one own drive (15) for circulating movement of the chain (19); and
    determining or identifying an actual position of individual circulatingly moved folding fingers (9) from the plurality of folding fingers (9) of the at least one first individual module unit (5) and an actual position of individual circulatingly moved folding fingers (9) from the plurality of folding fingers (9) of the at least one second individual module unit (7), and controlling the own drives (15) of the at least one first individual module unit (5) and of the at least one second individual module unit (7) to achieve alignment of the plurality of individual folding fingers (9) of the at least one first individual module unit (5) relative to the plurality of folding fingers (9) of the at least one second individual module unit (7).

22. The method of claim 21 wherein at least the at least one first individual module unit (5) comprises a first multitude of folding fingers moved by a first chain and a second multitude of folding fingers moved by a second chain.

* * * * *